(12) United States Patent
Duprez et al.

(10) Patent No.: US 8,100,695 B2
(45) Date of Patent: Jan. 24, 2012

(54) SIMULATOR FOR MEDICAL TRAINING WITH DETACHABLE SELF-SEALING HOLLOW MEMBER

(75) Inventors: Virginie Duprez, Toulon (FR); Øystein H. Gomo, Hundvåg (NO); Einar Egelandsdal, Stavanger (NO)

(73) Assignee: Laerdal Medical AS, Stavanger (NO)

( * ) Notice: Subject to any disclaimer, the term of this patent is extended or adjusted under 35 U.S.C. 154(b) by 545 days.

(21) Appl. No.: 12/394,387

(22) Filed: Feb. 27, 2009

(65) Prior Publication Data

US 2009/0291421 A1   Nov. 26, 2009

Related U.S. Application Data

(60) Provisional application No. 61/064,353, filed on Feb. 29, 2008.

(30) Foreign Application Priority Data

Feb. 29, 2008 (NO) .................................... 20081054

(51) Int. Cl.
    *G09B 23/28* (2006.01)
(52) U.S. Cl. ........................................ 434/268; 434/267

(58) Field of Classification Search .................. 434/262, 434/267, 268, 272

See application file for complete search history.

(56) References Cited

U.S. PATENT DOCUMENTS

| | | | | |
|---|---|---|---|---|
| 3,789,518 | A * | 2/1974 | Chase | 434/272 |
| 4,134,218 | A * | 1/1979 | Adams et al. | 434/267 |
| 4,494,936 | A * | 1/1985 | Stickles | 434/273 |
| 5,839,904 | A * | 11/1998 | Bloom | 434/268 |
| 6,568,941 | B1 * | 5/2003 | Goldstein | 434/267 |
| 6,589,057 | B1 * | 7/2003 | Keenan et al. | 434/271 |
| 6,854,976 | B1 * | 2/2005 | Suhr | 434/273 |
| 7,255,565 | B2 * | 8/2007 | Keegan | 434/272 |
| 7,306,465 | B2 * | 12/2007 | White | 434/268 |

* cited by examiner

*Primary Examiner* — Kurt Fernstrom
(74) *Attorney, Agent, or Firm* — Connolly Bove Lodge & Hutz LLP

(57) ABSTRACT

Simulator for medical training having at least a detachable, fluid-tight hollow member comprising:
at least a portion (1; 25) made of a self-sealing material;
an opening (2; 17) to fill said hollow member with a fluid, said opening (2, 17) being provided with closure means (4; 26) or being connected (8) to closure means;
fastening means (4,5; 28) to detachably fasten said hollow member to said simulator.
The portion made of self-sealing material allows multiple punctures before having to be replaced.

12 Claims, 12 Drawing Sheets

SIMULATOR FOR MEDICAL TRAINING WITH DETACHABLE SELF-SEALING HOLLOW MEMBER

CROSS REFERENCE TO RELATED APPLICATIONS

This application claims the benefit of U.S. Provisional Application No. 61/064,353, filed Feb. 29, 2008 and also claims priority from Norwegian Application 2008-1054 filed Feb. 29, 2008, the entire contents of which are incorporated herein by reference.

FIELD OF INVENTION

The present invention relates to simulators for training medical or paramedical personnel comprising one or more detachable hollow members allowing multiple punctures without resulting in unacceptable levels of leakage of fluids into or out of the hollow members.

TECHNICAL BACKGROUND

Simulators are more and more important in training medical or paramedical personnel. Injections and sampling by means of medical devices for injection, puncture and aspiration, such as hypodermic needles and intraosseous needles, is one of the fields of interest for such simulators. Models have therefore been developed to simulate, for example, tension pneumothorax relief, intraosseous injection (IO), and intravenous injection. Presently available simulators typically comprise fluid-tight hollow members made of latex or PVC. Therefore they suffer from the disadvantage of not being suitable for multiple uses as they will leak after one or a few punctures. The main drawback of such known hollow members is thus that they must be replaced after a very short time. Moreover, latex has the disadvantage of being relatively expensive and soft PVC contains a substantial amount of phthalates as softeners, which poses a health concern.

US 2005/0202381 A1 discloses anthropomorphic phantoms containing conduits that simulate blood vessels or cavities to mimic anthropomorphic cavities. Such conduits or cavities may be hollow or filled with liquids or filled with a solid object. The body of the phantom is made of a chemical composition that is self-sealing when punctured. A preferred composition comprises highly plasticized styrene-ethylene-butylene-styrene block copolymers. The phantom is prepared by a moulding process and the internal cavities and conduits are formed in the mould directly in the body of the phantom. A disadvantage of this solution is that when the material forming the body of the phantom looses its self-sealing property after repeated uses, the entire phantom has to be discarded.

U.S. Pat. No. 5,839,904 discloses a phlebotomy training device that includes fluid circuits simulating veins and arteries. The device is suitable to be secured to a person's arm to realistically simulate positioning of an arm during venous puncture procedures. The device comprises a core element made of a resilient material, formed with channels designed to receive venous and arterial tubing capable of withstanding repealed punctures from a conventional hypodermic needle while maintaining water tight integrity. Again, a disadvantage of this solution is that when the material forming the venous and arterial tubing looses its self-sealing property after repeated uses, the entire phlebotomy training device has to be discarded.

There thus exists a need for simulators for medical training that allow for multiple injections/punctures and overcome the shortcomings of the simulators according to the prior art.

More particularly, there exists a need for simulators having parts that allow multiple punctures and have a life cycle significantly longer than the simulators according to the prior art.

SUMMARY OF THE INVENTION

It is therefore an object of the present invention to disclose a simulator for medical training having at least a detachable, fluid-tight hollow member, said hollow member being characterized by comprising:
  a) at least a portion made of a self-sealing material;
  b) an opening to fill said hollow member with a fluid, said opening being provided with closure means or being connected to closure means;
  c) fastening means to detachably fasten said hollow member to said simulator,
wherein said self-sealing material fulfils a test in which a fluid-tight hollow member having a wall thickness of 2.5 mm inflated to apply an initial pressure of 500 mbar undergoes a pressure drop after 60 seconds to not less than 50 mbar caused by 10 punctures made by a needle having a gauge size of 16 G.

In the present description the term "fluid" encompasses gases and liquids. Also, the term "fluid-tight" refers to the property of the hollow member to retain a fluid without substantial leakage at the initial state, namely before being punctured.

A simulator for training medical and/or paramedical personnel in the use of medical devices for injection, puncture and aspiration that comprises a hollow member allowing multiple punctures permits multiple training sessions without the need for changing the hollow member and ensures a more realistic and effective training.

Also, a simulator in which the hollow member is detachable from the body of the simulator, so that it can be replaced when the hollow member is no more useable, extends the life cycle of the entire simulator, thereby reducing the investment cost for a user.

Moreover, a simulator in which only the portion of the hollow member that is subjected to multiple punctures is made of a self-sealing material allows reducing the maintenance cost for a user.

The hollow member can be Oiled with gases or liquids depending on the organ of the body to be simulated.

For training tension pneumothorax relief, the hollow member is filled with gas. Air is the most preferred gas, but also other gases that are not toxic and that are compatible with the materials of the hollow member are applicable.

For training intraosseous injection (IO) the hollow member is filled with liquid. The liquid consists preferably of aqueous solutions such as artificial body fluids, e.g. artificial blood, but also other liquids that are not toxic and that are compatible with the materials of the hollow member are applicable.

SHORT DESCRIPTION OF THE FIGURES

DETAILED DESCRIPTION OF THE INVENTION

In the present description the term "medical simulator" or "simulation manikin" or "manikin" is used to cover both a full size anatomical manikin, or parts thereof such as an arm, a leg, a torso etc, for simulation purposes.

The hollow member for a simulation manikin according to this invention may have any shape that is suitable to be detachably mounted and fastened to the body of the manikin in a desired position. The hollow member may be an elongated tubular body, which is preferably closed in at least one end, or a body, or bladder, having regular or irregular shape.

FIGS. 1-5 show a hollow member of a medical simulator according to a first embodiment of the present invention. In this case the simulator is used for training tension pneumothorax relief and the hollow member will be designated in the following of the description as "bladder".

Figure 1:
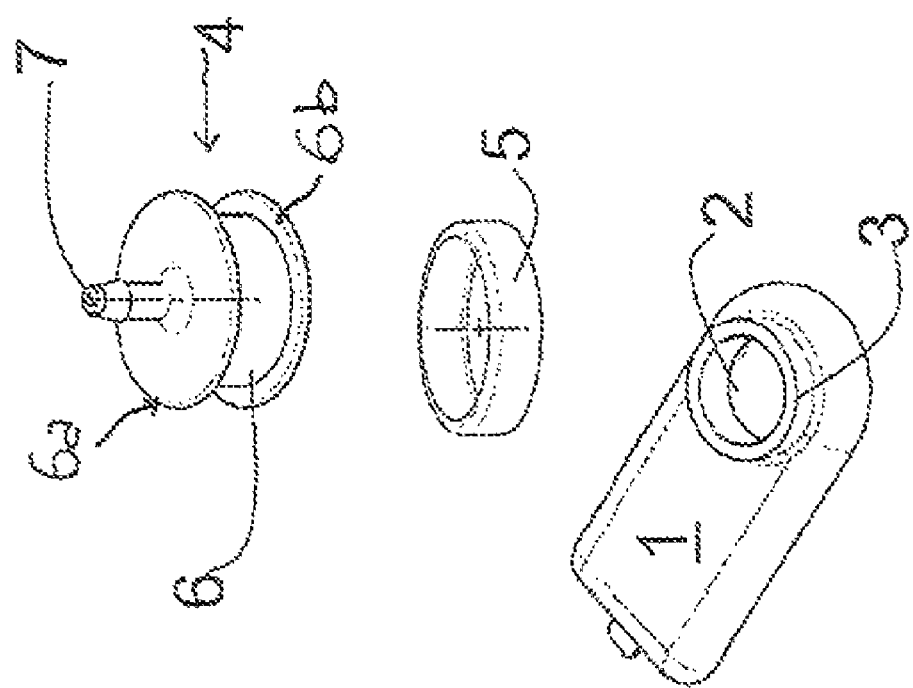
FIG. 1 is a perspective exploded view of a hollow member of a medical simulator according to a first embodiment of the present invention.

FIG. 1 is an exploded view of the parts of a bladder for simulation of tension pneumothorax. A bladder 1 having a circular opening 2 surrounded by an upward rim 3 is made of a self sealing polymer, as described in the following of this description. The bladder 1 is preferably manufactured by injection moulding.

A nipple part 4 and a clamp ring 5 are made by machining a hard polymer material such as POM (polyoxymethylene), polyacetal, polyformaldehyde, or by injection moulding a thermoplastic material such as PE (polyethylene) or PP (polypropylene) and the like. The nipple part comprises a main body 6 that is adapted to be inserted into the opening 2 of the bladder 1, and a nipple 7 that is adapted to be connected to a tube.

Figure 2A:
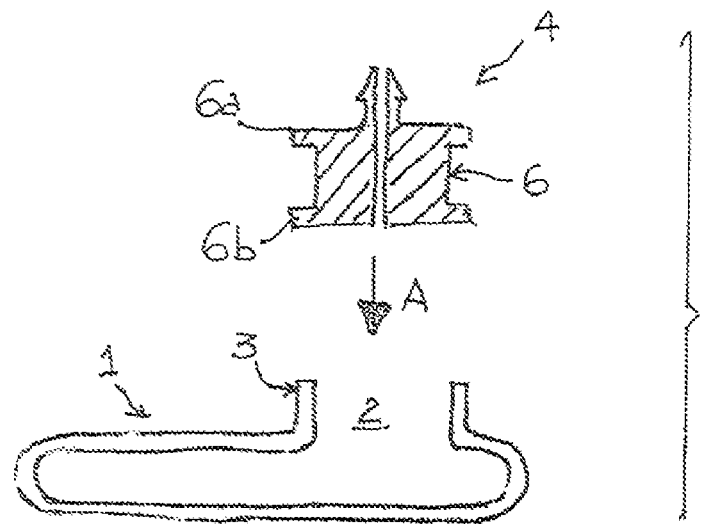
FIGS. 2A-2D are schematic views of the hollow member of FIG. 1.

FIG. 2A shows the bladder 1 with the nipple part 4 superimposed to opening 2, so that the nipple part 4 can be inserted into the opening 2 according to the direction of arrow A. The nipple part 4 is provided with an upper flange 6a and a lower flange 6b.

Figure 2B:
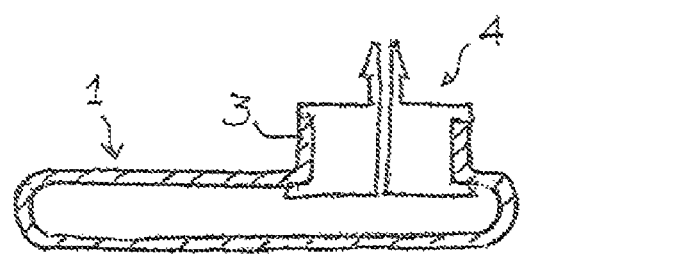

FIG. 2B shows the nipple part 4 inserted into opening 2 of the bladder 1. In such position the upward rim 3 of the bladder 1 is housed in a seat formed between the upper and lower flanges 6a and 6b of the main body 6 of the nipple part 4. The thickness of the rim 3 corresponds substantially to the depth of the seat formed between the upper and lower flanges 6a and 6b, so that such seat is filled by rim 3.

Figure 2C:
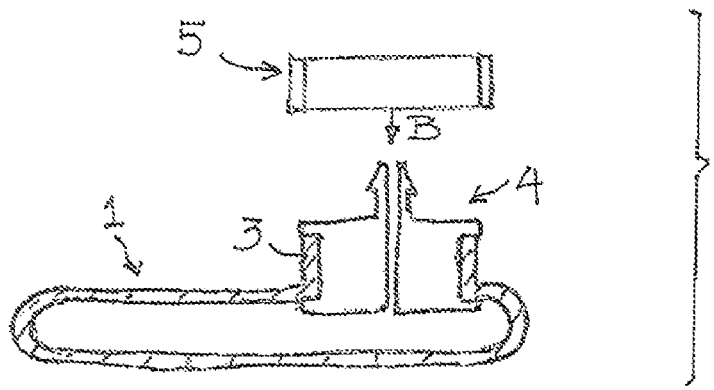

FIG. 2C shows the assembly formed by the bladder 1 and the nipple part 4 inserted into the opening 2, with a clamp ring 5 superimposed on it, so that the clamp ring 5 can be mounted on the nipple part according to the direction of arrow B.

Figure 2D:
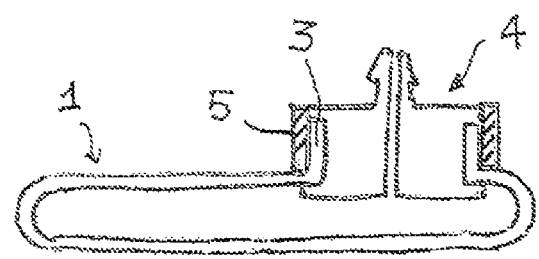

FIG. 2D shows the clamp ring 5 mounted on the upward rim 3 and the nipple part 4 to seal the connection between the nipple part 4 and the bladder 1.

Figure 3:
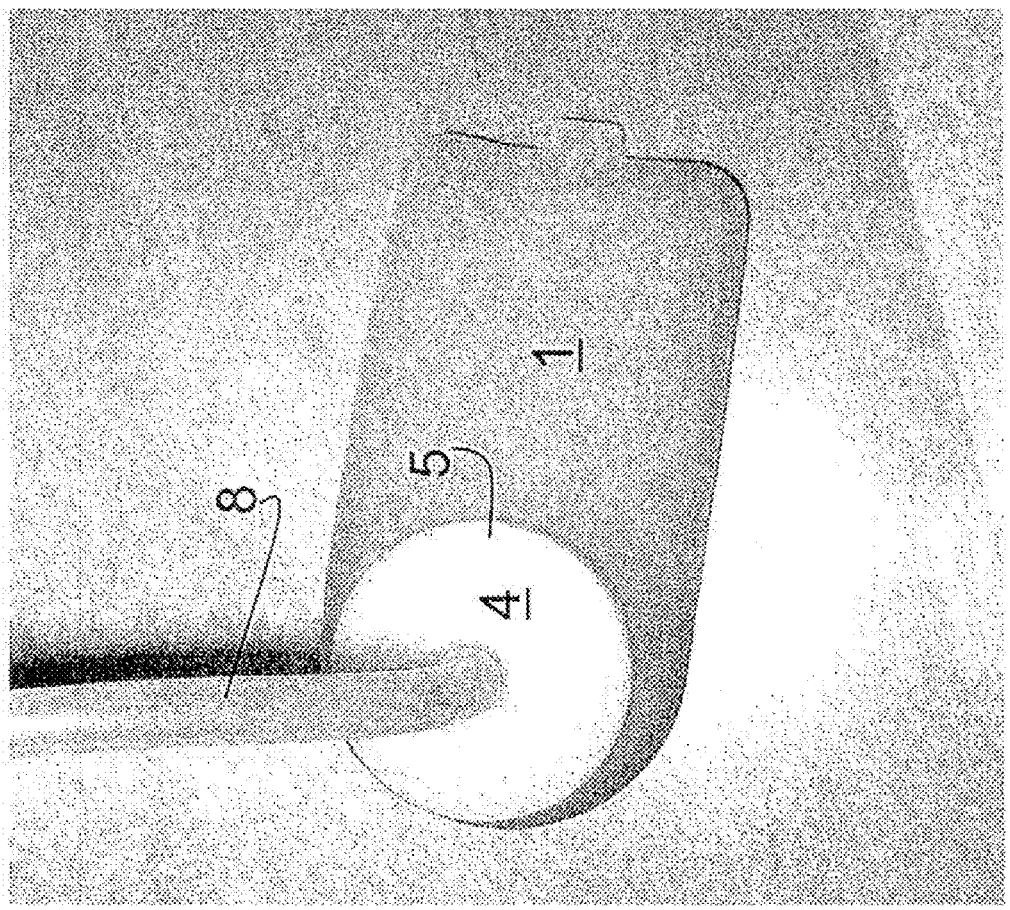
FIG. 3 is a picture of the hollow member of FIG. 1 in an assembled disposition.
Figure 4:
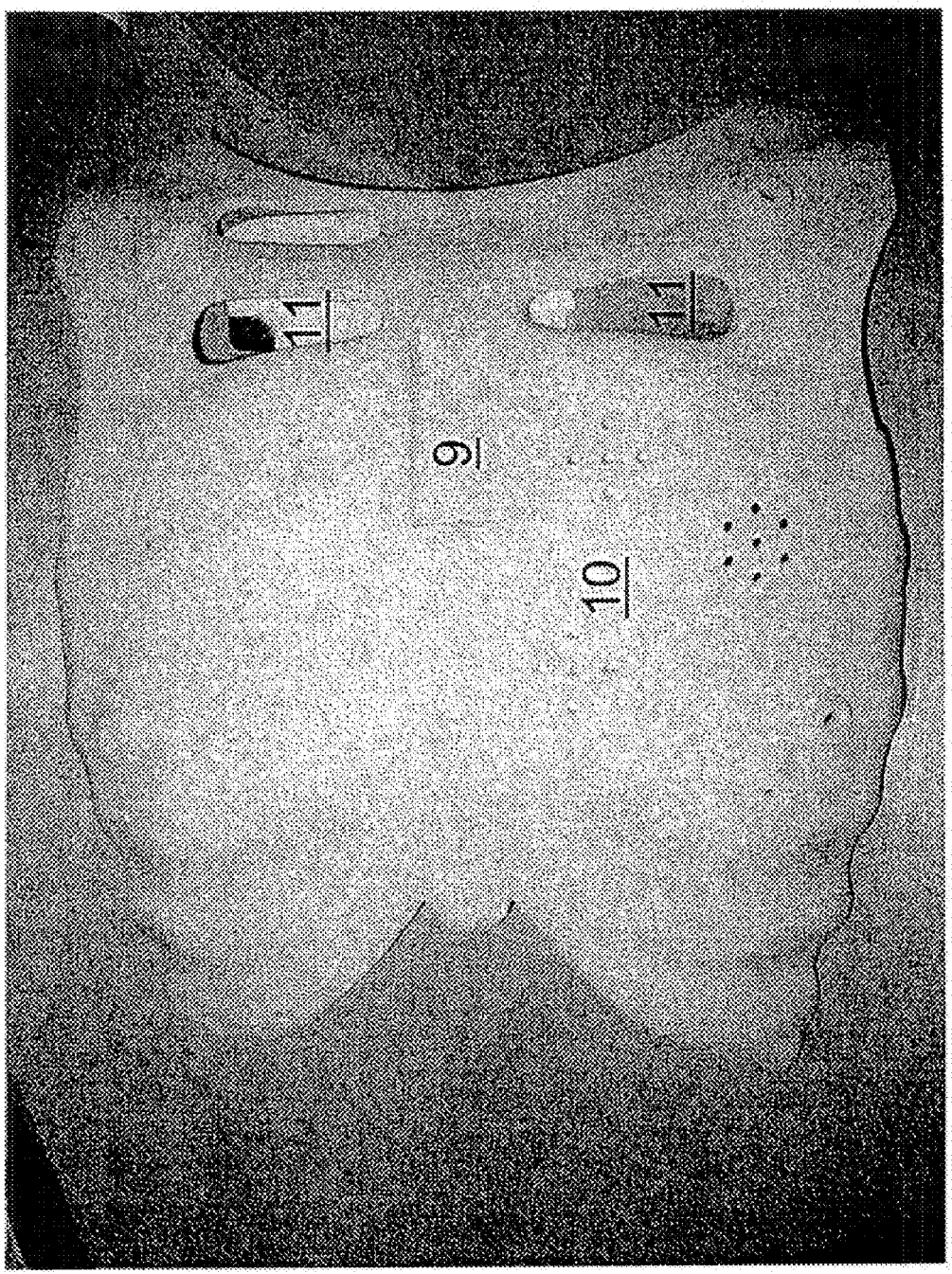
FIG. 4 is a picture showing a front view of a chest of a medical simulator suitable for incorporation of the hollow member of FIG. 3.
Figure 5:
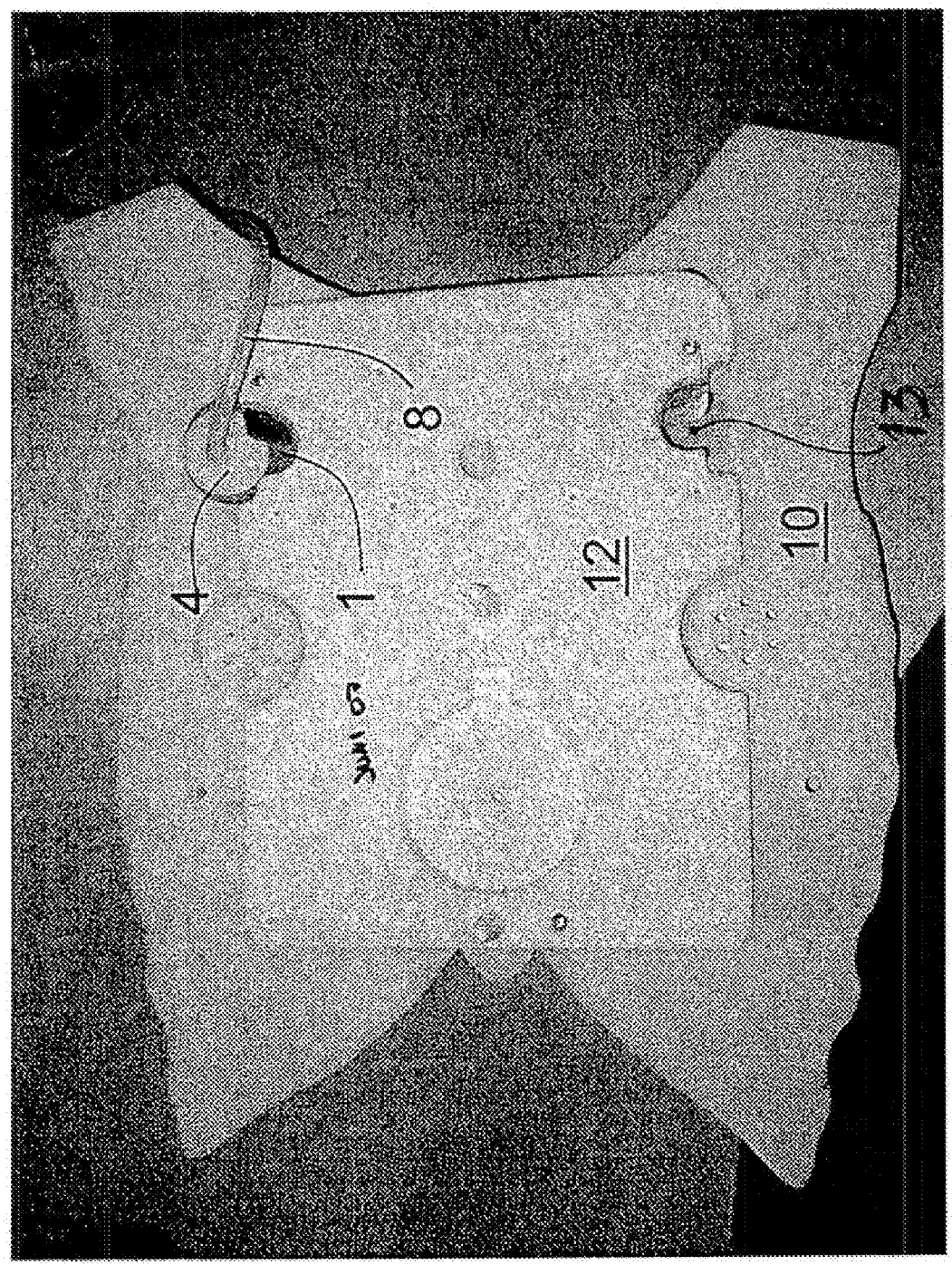
FIG. 5 is a picture showing a rear view of the chest of FIG. 4.

FIGS. 1 and 3 show the assembly of a bladder 1, nipple part 4 and clamp ring 5, where a tube 8 is connected to the nipple 7. FIG. 4 is a picture of an artificial chest 10 for a simulation manikin seen from the front thereof. Openings 11 are provided at positions corresponding to the space between the 2nd and 3rd rib of a patient. At least one bladder as described above is housed in a recess 13 formed by the artificial chest 10 and the support plate 12, as illustrated in FIG. 5. Such recess 13 may be accessed through the corresponding openings 11 of the artificial chest. The bladder(s) is (are) supported and kept in place within recess 13 by means of the support plate 12 connected at the rear side of the artificial chest 10, as illustrated in FIG. 5. The assembly of nipple part 4 and clamp ring 5 functions as fastening means of the bladder in cooperation with support plate 12, since this latter overlaps partially recess 13 and prevents the assembly from coming out of recess 13. The tube 8 is connected to the bladder, as described above, to make possible to inflate the bladder. The tube 8 may also be connected to a pressure measuring device to monitor the pressure of the air in the bladder and to monitor the development of pressure in the bladder. Also, tube 8 is closed at one end by remote closure means, not shown, so that a desired pressure can be kept within the bladder after inflation.

FIG. 4 also illustrates a recess 9 for an ampoule for simulation of an intraosseous injection in a sternum of a patient. This will be further described below.

The production of the hollow member, including the bladder described above, may be carried out by any suitable methods, including injection moulding and extrusion. A preferred method for production of the hollow member is injection moulding.

It is also possible to improve the characteristics of the hollow member by overmoulding the hollow body with another polymer softer than the underlying polymer.

Overmoulding may be performed as known by the skilled person. The material needs to have the appropriate combination of properties in term of hardness, tear strength and flexibility to possess the ability of resealing after puncturing more than 5 times, and up to 10 punctures or more, with needles of different sizes, and thereby minimizing the leaking of fluid and also preventing air to penetrate into the system.

To be classified as self sealing according to the present invention, the hollow member has to maintain a pressure of at least 50 mbar for a period of at least 60 seconds in the tests that are illustrated in the Examples below. Preferably, the hollow member has to maintain a pressure of at least 75 mbar, even more preferably a pressure of at least 100 mbar for a period of 60 seconds.

A self-sealing material according to the present invention can be a material made by one or more layer of a polymer or of different polymers, or can be a laminated or composite material comprising textile layer impregnated with polymeric materials, provided that it is fluid-tight in its initial state.

Polymers having inherent self-sealing properties can be selected from the group consisting of: thermoplastic elastomers, silicone rubber, synthetic rubber, polyolefins, polyurethanes, polytetrafluoroethylene or other elastomers.

According to one embodiment, the hollow body is made of a self-sealing thermoplastic elastomer (TPE). Preferred self-sealing TPE's are styrene-ethylene-butadienestyrene (SEBS) copolymers. Good results have been achieved with Dynaflex® thermoplastic elastomer compounds from GLS Corporation, such as G2706-1000-00.

According to another embodiment, the hollow body is made of a self-sealing silicone rubber. Preferred self-sealing silicone rubber is addition-cure silicone rubber platinum or tin catalyzed, commercially available from several suppliers.

The simulation of tension pneumothorax relief is performed as follows:

Patient case: Following an injury to the thorax, air may enter the room between the lungs and the surrounding tissue (the pleura). The entrapped air will increasingly prevent the lungs from expansion. The patient has developed a tension pneumothorax; a life threatening condition where the patient will eventually suffocate without proper treatment.

Treatment: The common procedure is to insert a hypodermic needle into the chest between the 2nd and the 3rd rib, and to evacuate the air through the hypodermic needle by means of a syringe. After evacuation of the air the lungs should be able to expand fully again, and normal respiration should thereby be re-established.

Simulation: A tension pneumothorax is simulated by limiting the visible chest rise. A bladder shaped to lit in the chest at the correct location is inflated with air. The air pressure is monitored by a pressure sensor. As the student performs a correct needle decompression by inserting a hypodermic needle through the chest skin and the inflated bladder, the pressure drop is detected, and the patient simulator starts to "breath" normally again.

Simulators for simulation of tension pneumothorax known from the prior art use bladders and associated tube made as a single piece in latex. Latex gives a good simulation of human tissue but has limited self sealing properly. Therefore, the bladder and tube assembly has to be replaced frequently, and may cause allergic reactions. This reduces the effectiveness and realism of training sessions where several students shall perform the same procedure. Additionally, a hollow member and a tube made both from latex are expensive to produce. Latex has also the additional problem of aging during storage, causing the material to crack. By replacing the latex bladder and tube assembly in such a simulation model with a hollow member according to the present invention, only the bladder needs to be made of a self-sealing material, so that it may be used repeatedly, making the training more real and effective, in addition to reduce cost and health risks. Therefore, the nipple part and the tube, which are not to be punctured, may be made of a harder, more resistant material which is not to be replaced even when the bladder has to be replaced at the end of its life cycle, after having been punctured many times.

Figure 6:
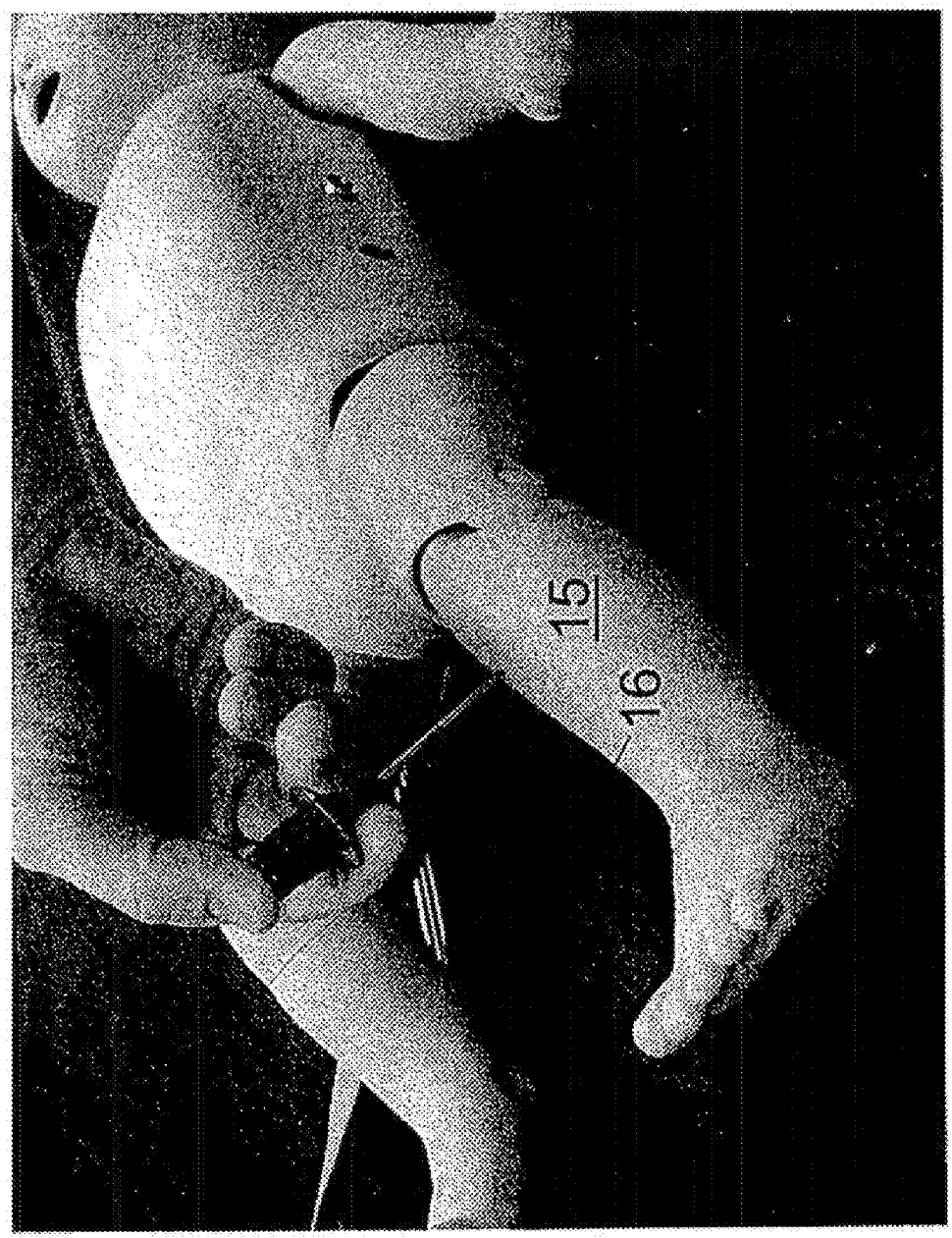
FIG. 6 is a picture showing intraosseous injection in a training manikin.

FIG. 6 illustrates another embodiment of the present invention for a simulation model for intraosseous injection (IO), wherein an intraosseous needle is inserted into an artificial tibia of a training manikin. In such embodiment the hollow member simulates a portion of a tibia to be perforated to reach the bone marrow.

Figure 7:
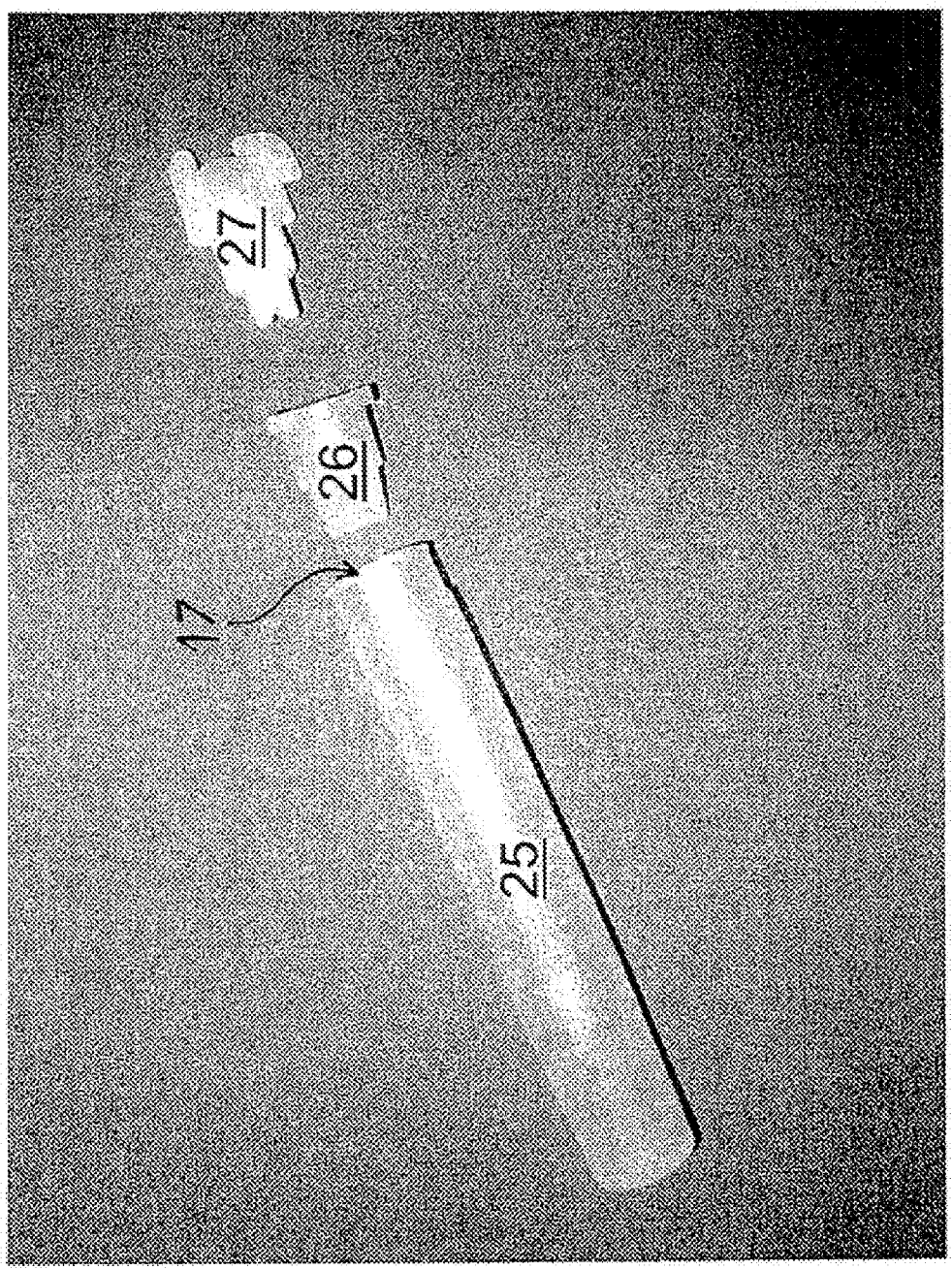
FIG. 7 is a picture showing an exploded view of a part of a hollow member of a medical simulator according to a second embodiment of the present invention.

FIG. 7 is an exploded view of an ampoule according to the present invention for a simulation model for intraosseous injection, comprising a tubular member 25 that is closed in one end and has an opening 17 at the opposed end. The tubular member 25 is made of a self sealing polymer as for the above described bladder. A cap 26 having a one way valve to facilitate filling of the tubular member 25 with artificial blood is provided to close the opening 17 of the tubular member. A needle guide 27 may be provided to guide a needle for filling the tubular member by means of syringe. Additionally, a spring may be provided inside the tubular member to prevent it from collapsing. The need for a spring is however dependent on the shape keeping properties of the walls of tubular member.

Figure 8:
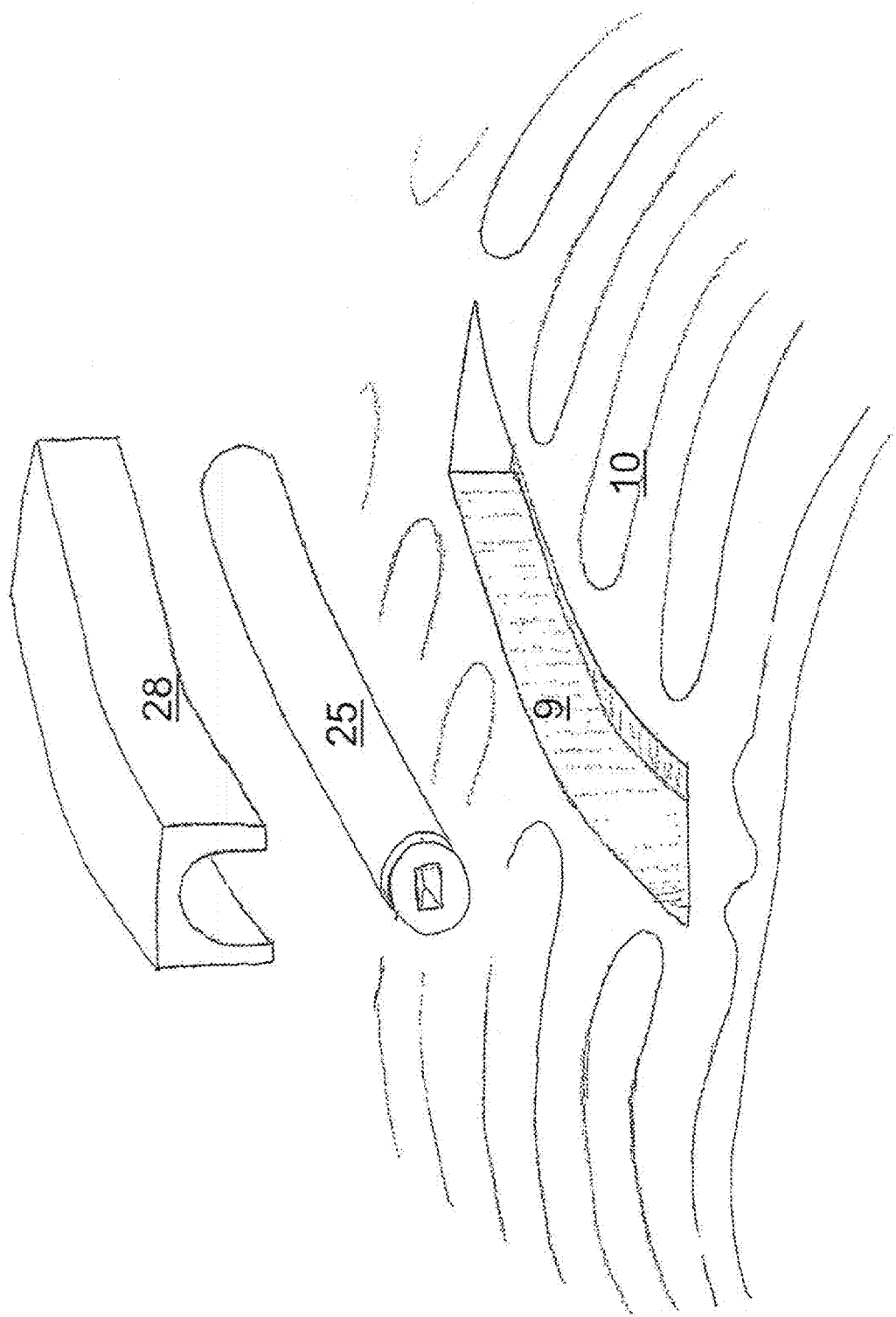
FIG. 8 is a schematic exploded view of the hollow member according to the second embodiment of the invention associated to a sternum of a simulated ribs structure.

The ampoule consisting of the tubular member 25 and the cap 26 may be arranged in cavity in an artificial tibia for a training manikin, as in the embodiment illustrated in FIG. 6, or in a recess 9 in an artificial chest as illustrated in FIGS. 4 and 8. A cover member 28 made of a polymer material having properties close to the properties of bone, is provided to cover the ampoule and fasten it in the recess 9. To this purpose the bottom side of the cover member 28 is formed with a cavity that matches the shape and size of the tubular member 25. The artificial chest in FIG. 8 or an artificial tibia as in FIG. 6 is also covered by artificial skin to make the simulation model as realistic as possible. The cover member 28 functions as fastening means since it holds the ampoule into the recess 9.

The simulation of model for intraosseous injection (IO) is performed as follows:

Patient case: The object is to give the patient medications through the bone marrow. This is usually done in the leg bone, the centre of the chest, or in the upper arm. FIG. 6 illustrates injection by means of an intraosseous needle (IO needle) 16 into the leg 15 of a simulation manikin. The IO needle is inserted into a not shown artificial tibia bone. The artificial tibia bone is made of a material which simulates the human bone tissue. A tubular hollow member filled with simulated blood is arranged in the centre of the artificial tibia bone.

The training/simulation are performed as follows: Simulation: The teaching purpose of IO practice is to find the correct insertion point in the bone (the student will have to feel for landmarks on the bone surface or measure from the ends of the bone), drill or press a designated IO needle through the bone to the correct depth, and aspirate blood into a syringe to verify the end of the hollow needle is in the correct place.

Today's solution: In existing manikins this is done by using disposable parts made of PVC, PUR or similar semi-hard plastic materials to simulate the bony tissue, and an ampoule made of latex, within the simulated bony tissue. The disadvantage with these materials is that they do not allow for multiple uses, since the simulated blood will leak out once the material is penetrated. Also, blood tends to dry within the ampoule.

According to the present invention, the simulated blood is contained in an ampoule made of self sealing material that is arranged inside a harder material that simulates the bone. An ampoule for intraosseous injection according to the present invention is illustrated in FIG. 7 which is an exploded view of such an ampoule. The ampoule will be covered at one or more sides by a simulated bone material in a simulation model, such as a manikin, to make the simulation as realistic as possible.

Again with reference to FIG. 4, the ampoule is placed in the recess 9, and is covered with a simulated bone material and a simulated skin to make the simulation model as realistic as possible. The ampoule may also be connected with a source for artificial blood through a tube, and may contain or be connected to sensors to register the result of the simulation.

When the ampoule is penetrated, simulated blood can be drawn out of the "bone". Once the needle is removed, the hole closes and prevents the remaining blood from leaking out.

Multiple sticks can be performed, and the ampoule may be both refilled and turned to further expand the number of training sessions.

The tubular hollow member used in the intraosseous injection (IO) may be connected to tubular members or the like to allow filling of additional simulated blood into the hollow members, and/or to allow connection of sensors. The hollow members may also be used in simulation models to give training in medicine administration by IV, Intra muscular injection, or the like.

Testing of Self-sealing Materials

Different tests were performed to compare the properties of test samples made of different materials, and the effect of the shape of the tested item, the wall thickness thereof, with regard to self sealing effect and leakage as a function of time and needle penetrations of the test sample.

TABLE 1

Tested materials

| Test sample polymer | Polymer type | Manufacturer/prod. No. |
|---|---|---|
| Polymer A | SEBS | VTC Elasteknic AB/ Dryflex 500400S |
| Polymer B | SEBS | GLS Corporation/ Dynaflex G2706-1000-00 |
| Polymer C | SEBS | VTC Elasteknic AB/ Dryflex 500400S |
| Polymer D | PVC | Laerdal Medical AS |
| Polymer E | SEBS | VTC Elasteknic AB/ Mediprene 500300S |
| Polymer F | Neoprene | Chemionic corp/latex medical device clear/neutral |
| Polymer G | Latex | Asheboro Medical Supplies/latex |

Test 1

Figure 9:
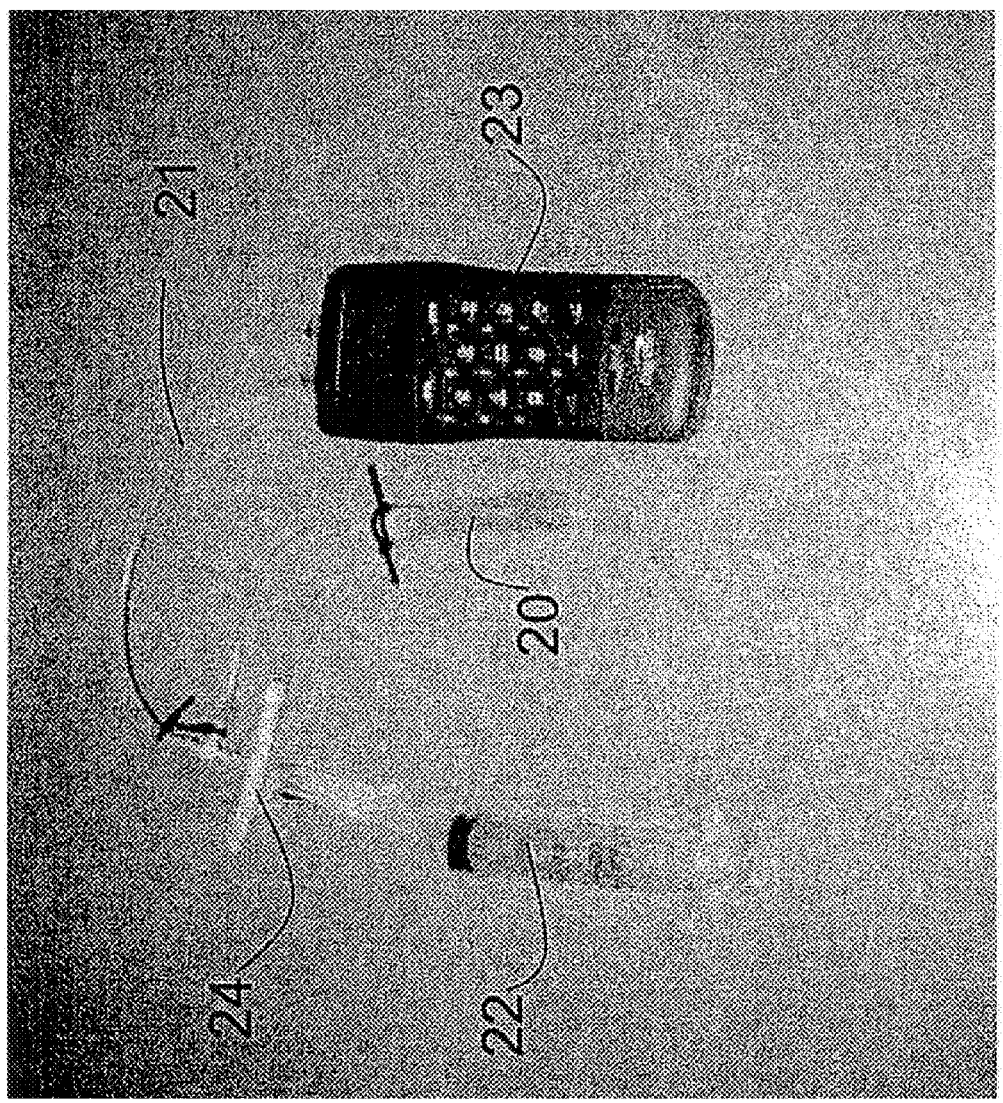
FIG. 9 is a picture of a test setup for testing the present hollow bodies.

Test samples 20 in the shape of tubular hollow members having a wall thickness of 1.4 mm made of different materials, were sealed at one end and airtight connected to tube 21 at the other end, as illustrated in FIG. 9. The tube 21 was connected to a syringe 22 for injection of air into the tube, and to a pressure meter 23 (Digitron 2082P). The materials for the test samples were selected for having self sealing properties.

A 20 mL syringe (22) was used to apply an initial pressure (~500 mbar) to the moulded test sample 20. After applying the initial pressure, the system was closed using a clamp 24, and a series of 4 sticks using a needle 16 G were applied. As known to a skilled person, the number in front of the G indicates the gauge of the needle. The higher the number, the thinner the needle.

After each stick, the materials were tested for self sealing performance by again applying a pressure close to the initial pressure (~500 mbar), and the pressure drop was measured in function of the time during 60 seconds. This measurement was reproduced 4 times after each stick in order to evaluate the leakage rate for each material.

Figure 10:
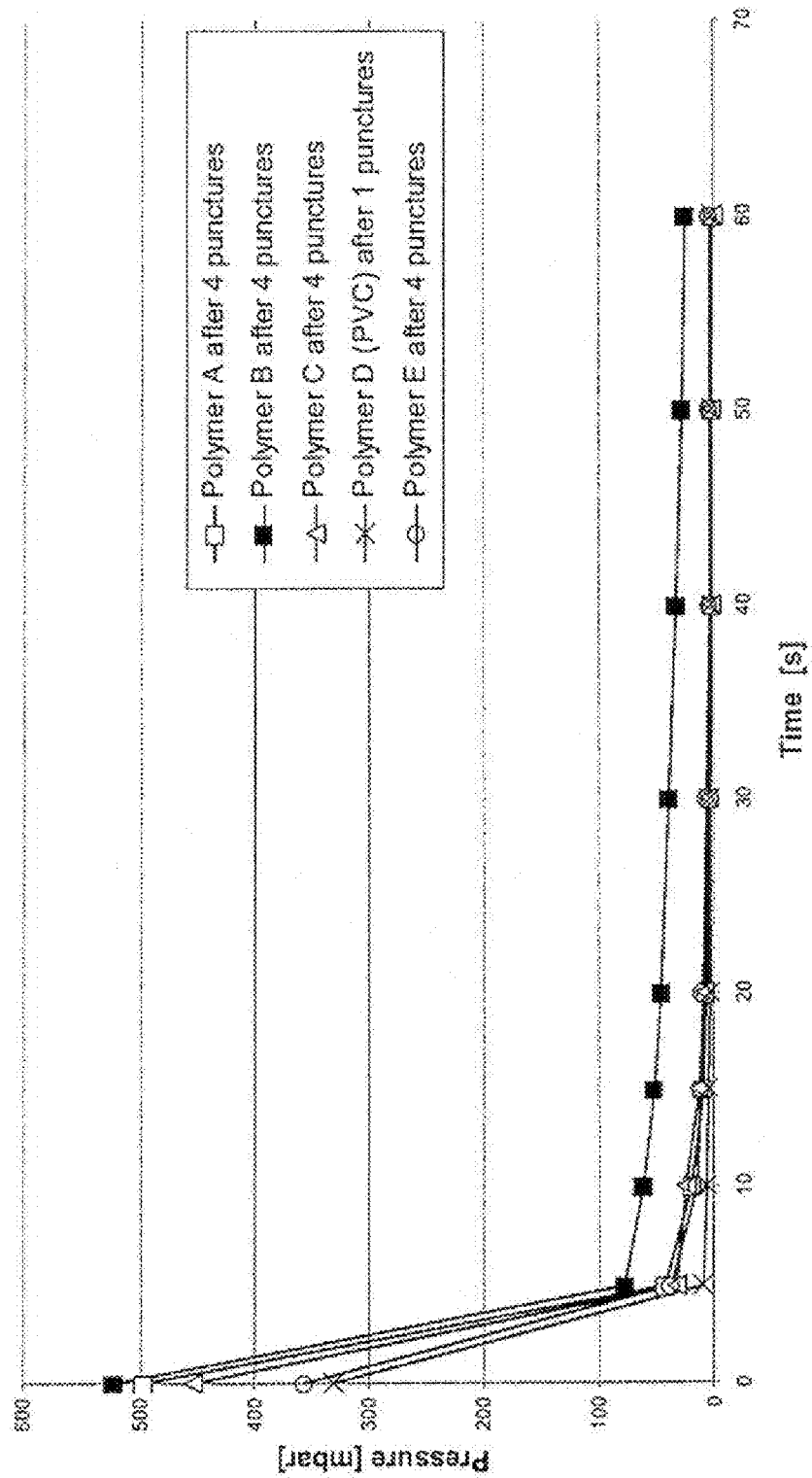
FIG. 10 is a graph illustrating self sealing properties of a series of polymers.

The test results are given in FIG. 10 and indicate that polymer B is superior over the remaining tested polymers with regard to self sealing properties, and reduction of leakage even after being penetrated several times (4) by a 16 G hypodermic needle. After 4 penetrations the test sample made of this material may still keep a pressure of ~25 mbar, a result that is expected to be improved if the wall thickness is increased. The PVC, polymer D, lost its capability to hold the pressure after one penetration and is not applicable for multiple penetrations of a hypodermic needle. The other polymers may be used for the present purposes but are not as favourable as poly B.

Test 2

Figure 11:
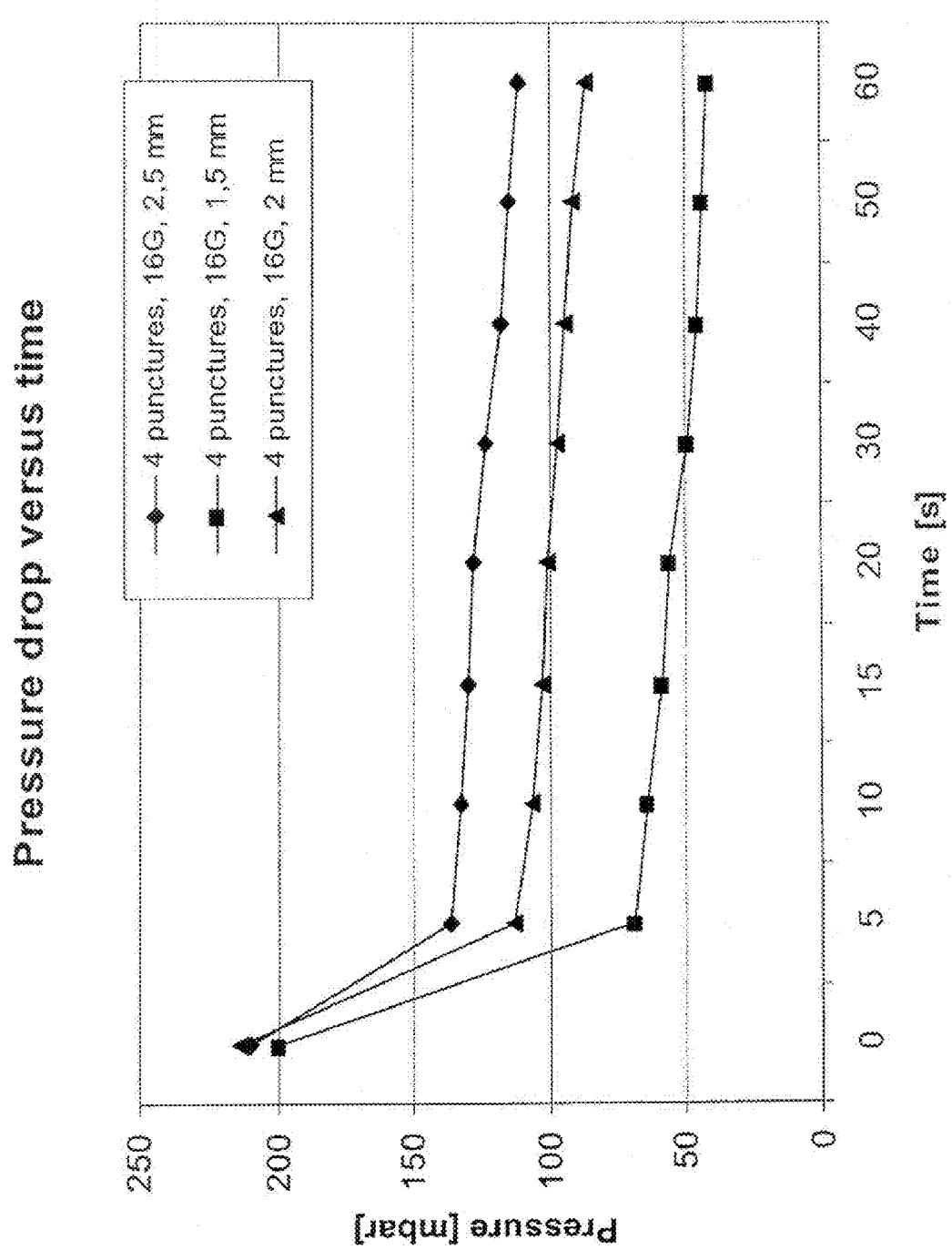
FIG. 11 is a graph illustrating self sealing properties of one polymer as a function of wall thickness.

Hollow member test samples having the shape of a pneumothorax bladder but having wall thicknesses of 1.5, 2.0 and 2.5 mm were produced, and used in a test substantially as described above to test for their self-sealing properties. An initial pressure of about 200 mbar was applied in the tests and the pressure drop as a function of the time after 4 punctures in each test specimen was recorded. The results are summarized in FIG. 11, and clearly illustrates that the self sealing properties are improved as the wall thickness increases at least up to 2.5 mm.

Test 3

A plurality of tests was performed substantially as described above, to confirm the applicability of polymer B for bladders for simulating tension pneumothorax. A bladder as illustrated in FIGS. 1, 2 and 3, having a wall thickness of 2.5 mm was inserted in the chest plate as illustrated in FIGS. 4 and 5, and inflated with a hand pump to apply an initial pressure (500 mbar) to the test object. The bladder inserted in the artificial chest was under constraint by the walls surrounding the bladder, a consideration that is of importance for the development of the pressure drop.

Figure 12:
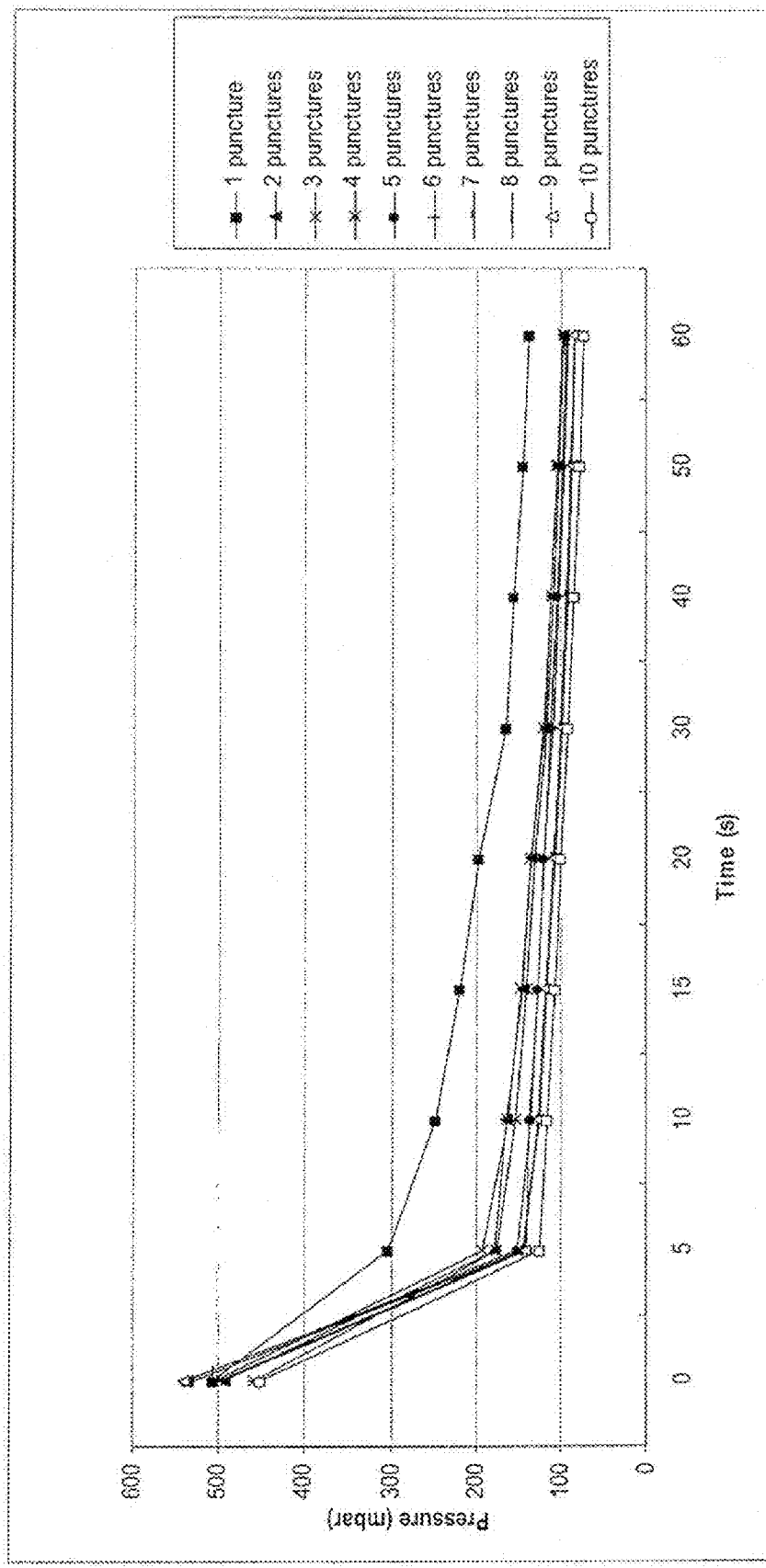
FIG. 12 is a graph illustrating self sealing properties of one polymer as function of number of punctures.

The pressure drop before puncturing, and after each puncture, was monitored as a function of the time during 60 seconds after inflation. This measurement was reproduced to simulate up to 10 punctures in order to evaluate the leakage rate in function of the size of the needle used during the training sessions. FIG. 12 illustrates the results using a 16 G hypodermic needle, both for an intact bladder (without puncture) and from 1 to 10 punctures. The results clearly show that there is a pressure drop during the 60 s measuring period. The results also illustrate a correlation between the number of punctures and pressure drop, as expected. The difference in pressure drop as function of punctures is most pronounced from intact bladder to one puncture, and then from one puncture to two punctures.

It appears clearly from FIG. 12 that the hollow member made of polymer B can be classified as a hollow member made of a self-sealing material according to the present invention, since it fulfils the condition that the hollow member has to maintain a pressure of at least 50 mbar for a period of at least 60 seconds.

As it is apparent from the description above, a medical simulator provided with a hollow member according to the present invention has many advantages over the known simulators. In particular, use of a self-sealing material allows multiple punctures, thereby providing a more realistic training to medical personnel and more convenient repeated use. Also, detachability of the hollow member allows replacing it when the number of punctures made causes unacceptable leakage of fluid. In such event, however, only the portion made of self-sealing material needs to be replaced, not the entire hollow member. For example, in case of the embodiment of FIGS. 1-5, the only part that needs to be replaced is the bladder 1. The nipple part 4, the clamp ring 5 and the tube 8 do not need to be replaced.

The invention claimed is:

1. Simulator for medical training having at least a detachable, fluid-tight hollow member, said hollow member being characterized by comprising:
   a) at least a portion made of a self-sealing material;
   b) an opening to fill said hollow member with a fluid, said opening being provided with closure means or being connected to closure means;
   c) fastening means to detachably fasten said hollow member to said simulator;
   wherein said self-sealing material fulfills a test in which a fluid-tight hollow member having a wall thickness of 2.5 mm, inflated to apply an initial pressure of 500 mbar, undergoes a pressure drop after 60 seconds to not less than 50 mbar caused by 10 punctures made by a needle having a gauge size of 16 G.

2. Simulator according to claim 1, characterized in that said self-sealing material is a synthetic polymer selected from the group consisting of thermoplastic elastomers, silicone rubber, synthetic rubber, polyolefins, polyurethanes, polytetrafluoroethylene.

3. Simulator according to claim 1, characterized in that said self-sealing material is a styrene-ethylene-butadiene-styrene (SEBS) copolymer.

4. Simulator according to claim 1, characterized in that said portion made of a self-sealing material has the form of a bladder having an opening provided with closure means formed by a nipple part connected via a tube to remote closure means.

5. Simulator according to claim 4, characterized in that said fastening means comprise an assembly formed by said nipple part and a clamp ring inserted onto said nipple part, said assembly being fastened to said simulator by a support plate.

6. Simulator according to claim 4, characterized in that said fastening means comprise an assembly formed by said nipple part and a clamp ring inserted onto said nipple part, said assembly being housed in a recess of said simulator and being fastened to said simulator by a support plate overlapping at least partially said recess.

7. Simulator according to claim 1, characterized in that said portion made of a self-sealing material has the form of a tubular member having an opening provided with closure means formed by a cap.

8. Simulator according to claim 7, characterized in that said fastening means comprise a cover member having on one side a cavity that matches the shape and size of said tubular member, whereby said tubular member and cover member may be fastened in a corresponding cavity of said simulator.

9. Simulator according to claim 7, characterized in that said cover member is made of a material having bone-like properties.

10. Simulator according to claim 1, characterized in that said hollow member comprises means to connect sensors to measure parameters relating to the fluid contained in said hollow member.

11. Simulator according to claim 1, characterized in that said hollow member comprises connection means to supply and/or withdraw fluid to/from said hollow member.

12. Simulator according to claim 1, characterized by comprising at least a recess in which said hollow member is arranged and kept in position by said fastening means.

* * * * *